W. M. BEATTY.
MOTOR VEHICLE.
APPLICATION FILED AUG. 10, 1914.
1,210,754.
Patented Jan. 2, 1917.
4 SHEETS—SHEET 4.
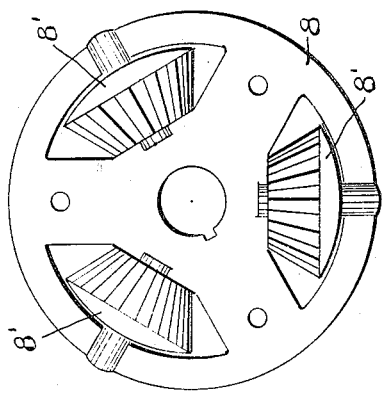
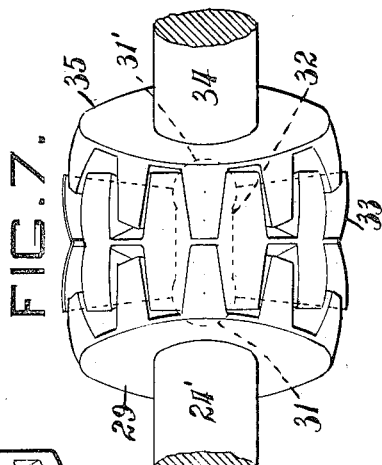
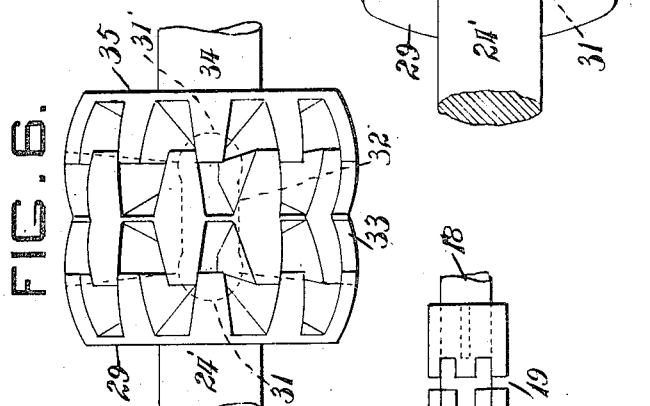
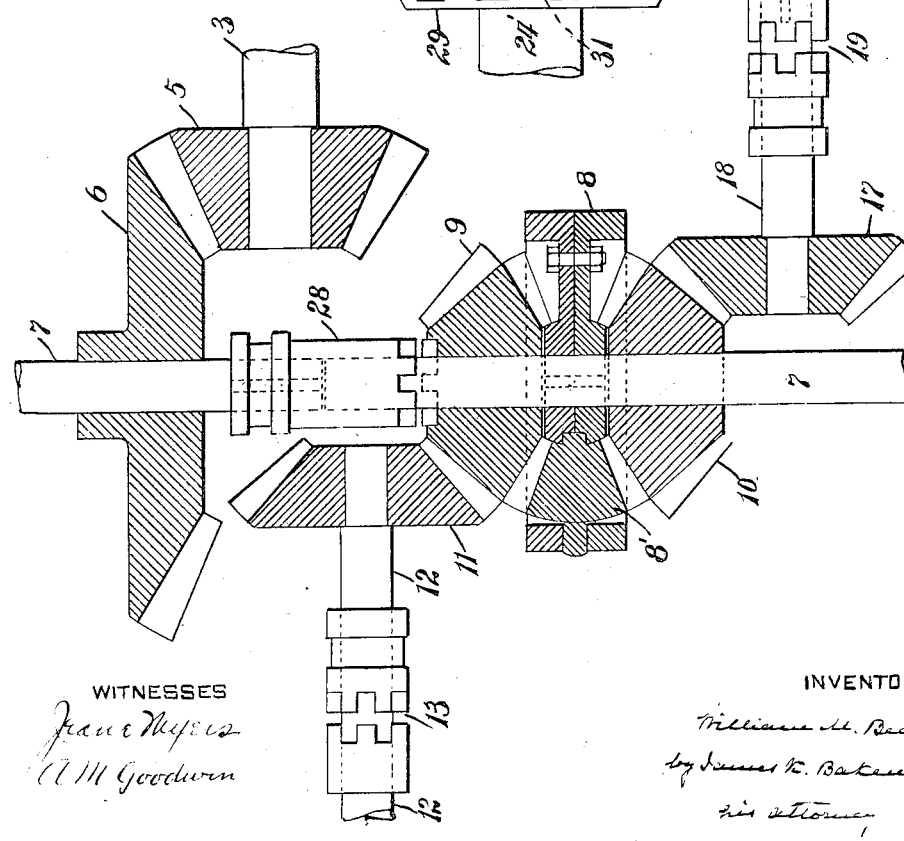
WITNESSES
INVENTOR
William M. Beatty
by James K. Bakewell
his attorney

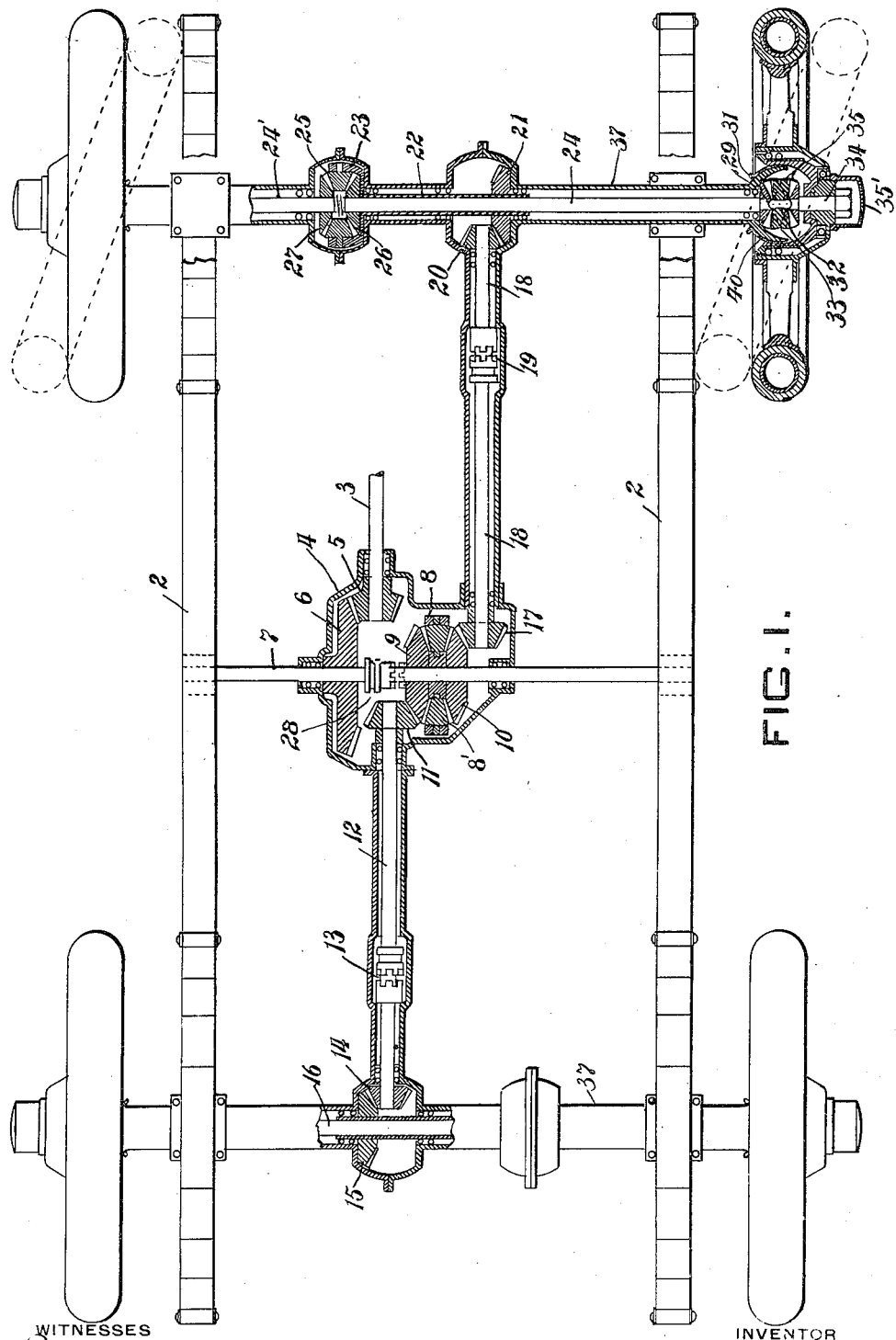

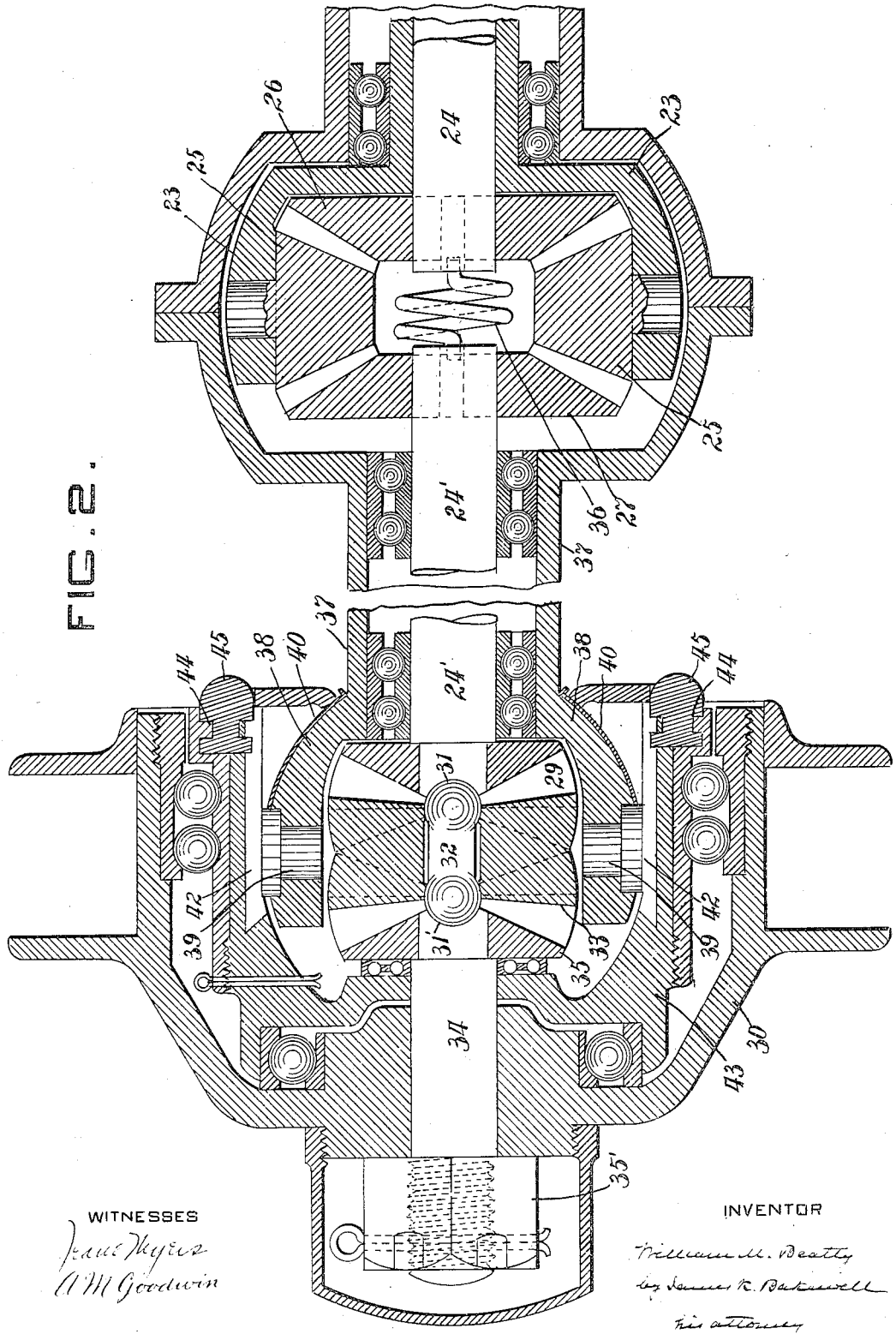

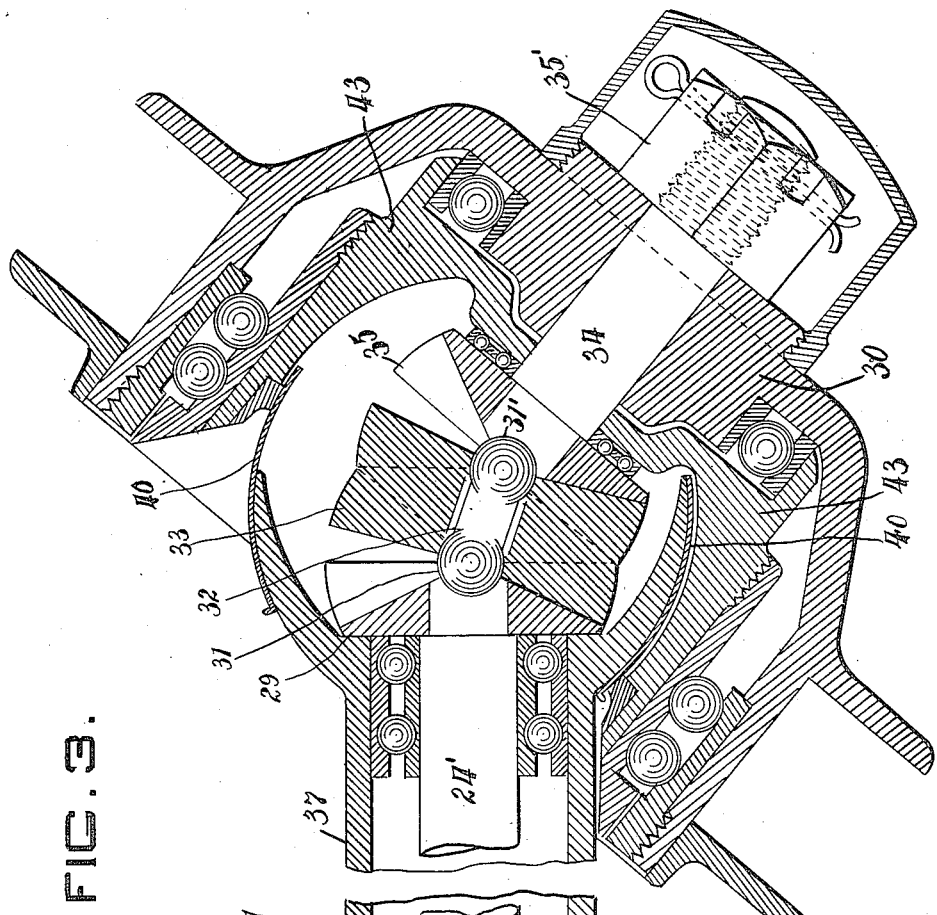
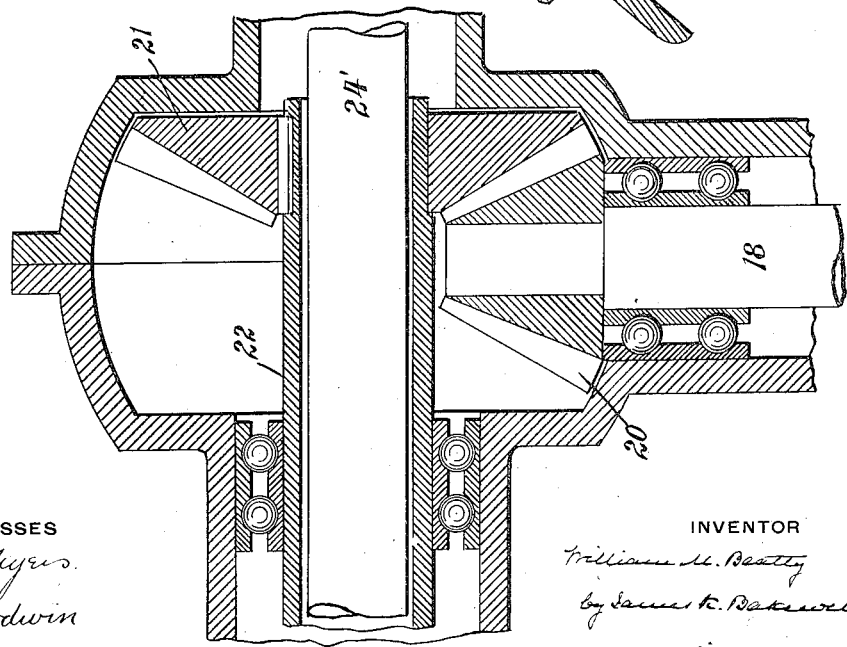

UNITED STATES PATENT OFFICE.

WILLIAM M. BEATTY, OF BEAVER FALLS, PENNSYLVANIA.

MOTOR-VEHICLE.

1,210,754. Specification of Letters Patent. Patented Jan. 2, 1917.

Application filed August 10, 1914. Serial No. 856,056.

*To all whom it may concern:*

Be it known that I, WILLIAM M. BEATTY, of Beaver Falls, in the county of Beaver and State of Pennsylvania, have made a new and useful Improvement in Motor-Vehicles, of which the following is a full, clear, and exact description.

My invention relates to an improvement in motor vehicles such as automobiles, auto trucks, traction engines, or other self-propelled machine and it consists in devices whereby the front and rear wheels may be propelled without interfering with the use of any or all of the wheels for the purpose of steering the machine, thus giving an increase in tractive power mobility and efficiency with less tendency of the wheels to skid or slip sidewise.

I will now describe my invention so that others skilled in the art to which it appertains may employ the same; reference being had to the accompanying drawings, forming part of this specification, in which:—

Figure 1 is a plan view of an automobile frame embodying my invention; Fig. 2 is a vertical sectional view showing the differential and the angle driving mechanism arranged in the hub of the wheel, the parts being in their normal position, the wheel being straight; Fig. 3 is a horizontal sectional view of the same, the wheel being at an angle to the driving axle; Fig. 4 is a plan view of the differential mechanism between the front and rear power shaft; Fig. 5 is a detached view of the differential spider and bevel pinions; Fig. 6 is a detached view of the angle bevel gears in their straight or normal position; and Fig. 7 is a like view, the gears being in a skewed or angular position.

In the drawing 2 represents the bed frame which, of course, varies with the character of the vehicle, and 3 represents the power shaft leading from the motor to the differential 4, which differential is composed of the bevel gear 5 which is keyed to the shaft 3 and meshes with a bevel gear 6 which is keyed to the differential shaft 7. Keyed to the shaft 7 is the spider 8 in which are mounted the differential pinions 8' which mesh with the bevel wheels 9 and 10 which are loosely mounted on the shaft 7, the gear 9 meshing with a bevel gear 11 which is keyed to the driving shaft 12 of the rear axle 16 and communicates therewith by means of the clutch 13, and the bevel gears 14 and 15, the bevel gear 15 being keyed to the hollow axle. The bevel gear wheel 10 of the differential 4 meshes with a bevel gear 17 which is keyed to the shaft 18 and communicates by means of a clutch 19 and bevel gear 20 with a bevel gear 21 which is keyed to the hollow axle 22 which terminates in a differential spider 23 on the front axle 24, in which spider are bevel pinions 25 which mesh with a bevel gear 26 which is keyed to the axle 24 and a bevel gear 27 which is keyed to the axle 24'. The purpose of the clutches 13 and 19 is to enable the rear or front axles to be disconnected from the power of the engine or motor, while a clutch 28 on the shaft 7 is for the purpose of locking the gear wheels 9 and 10 to the shaft 7 when it is desired to dispense with the differential movement.

Formed or keyed on the outer ends of the front axles 24 and 24' are the bevel gear wheels 29 which are located within the hubs 30 and in the end of the shafts 24, 24' are semi-spherical cavities in which are seated the spherical ends 31 of an idler shaft 32 to which shaft is keyed the double faced bevel pinion 33, or the shaft and pinion may be formed in one integral part. The other end of the idler shaft 32 is also in the form of a sphere 31' which is seated in the semi-spherical cavity in the end of the hub shaft 34 on which hub shaft is formed or keyed the bevel gear 35. The hub 30 is securely fastened to the hub axle 34 by means of the nut 35'. Between the shafts 24 and 24' in the differential 23 is a spring 36, the purpose of which is to take up the end play between the two shafts in the turning of curves.

Surrounding the axles 24, 24' is the dead axle 37 the outer ends of which are formed in cup shaped extensions 38 which are spherical on the outside with an elliptically shaped interior as shown in Figs. 2 and 3, the purpose of this difference in shape being to afford a greater support for the trunnions 39 by means of which the hub 30 is pivotally connected with the extension 38 of the dead axle 37. Secured to the hub 30 are dust shields 40, the purpose of which is to keep dust from finding access to the angle gears inside the hub.

Although I have not specifically described the same, the bearings are provided with anti-friction balls which are clearly shown in the drawings, and the several parts are also mechanically constructed to withstand wear and to enable the machine to be put together with the least possible amount of labor.

As the angle gears are located within the hub of the wheel, special devices are necessary for connecting the hub with the axle. For this purpose I use the short trunnions 39 which are pivoted in the extensions 38 of the dead axle 37, these trunnions 39 extending from dove-tailed heads 42 which slide into suitable cavities in the housing 43 which housing fits within the hub about the axles 34 and 24' and about which housing the hub revolves. These parts may be secured in the housing by any suitable means. I have, however, shown a locking device 44, which is a part of the steering arms 45, which holds the trunnion slide 42 in place. In assembling these parts the trunnion slide 42 is placed in the recesses in the extension 38, and the housing 43 is moved on over the slide, and the locking devices 44, 45 are placed, after which the wheel is put on which interlocks all the parts together.

The operation is as follows: The engine being started power is applied to the shafts 3 and 7. By means of the clutches 13 and 19 this power may then be applied to both the front and rear axles, or, by omitting to connect the clutch 19, to the rear axle only. When it is desired to change the course of the vehicle the front wheels are moved on their vertical axes in the usual manner, the gears 29, 35 and 33 remaining in mesh with each other irrespective of any angle they may be placed such as is usually required in steering motor vehicles. By throwing the clutch 28 in connection the differential 4 may be locked.

Although I have shown the angle mechanism as located in the hubs of the front wheels, I do not desire to limit my invention to such use, as similar angle mechanism may be placed outside of the hub or on the rear wheels in connection with the rear axle, and steering mechanism additional to that usually employed may be added, whereby both the front and rear wheels of the vehicle may be used for steering, thus enabling the vehicle to make a very short turn.

The advantages of my invention are that the effectiveness of the power is perfectly utilized it being distributed between the front and rear wheels; the danger of skidding is also lessened and greater control of the vehicle is obtained, not only in making sharp turns but also in guiding the vehicle in the desired direction.

Although I have shown specific forms of shafts, ball bearings, and gears, I do not desire to limit myself to the same.

Having thus described my invention, what I claim and desire to secure by Letters Patent, is:—

1. In a motor vehicle, the combination of driving mechanism, a driven shaft, a hub shaft, gears connected with the driven shaft and the hub shaft, intermediate gears between the gears of the two shafts, and ball and socket connection between the intermediate gears and the shafts.

2. In a motor vehicle, the combination of an axle shaft, angle gearing comprising oppositely arranged gear members connected by an intermediate gear member rotatable upon a horizontal axis, said members adapted to rock laterally upon each other and connected with one or more of the wheels of the vehicle by means of which power may be imparted to the wheel when at an angle to the line of the axle.

3. In a motor vehicle, the combination of an axle shaft, a hub shaft, gears connected with the driven shaft and the hub shaft, an intermediate double-faced gear between the gears of the two shafts, and ball and socket connection between the intermediate gear and the shaft gears.

4. In a motor vehicle, the combination of a power shaft, a hub, bevel gears connected respectively with the power shaft and the hub, and a double-faced bevel gear located within the hub and connecting the shaft bevel gear and the hub bevel gear, and angularly movable with respect to each of said gears.

In testimony whereof, I have hereunto set my hand.

WILLIAM M. BEATTY.

Witnesses:
T. B. HUMPHRIES,
JAMES K. BAKEWELL.